UNITED STATES PATENT OFFICE.

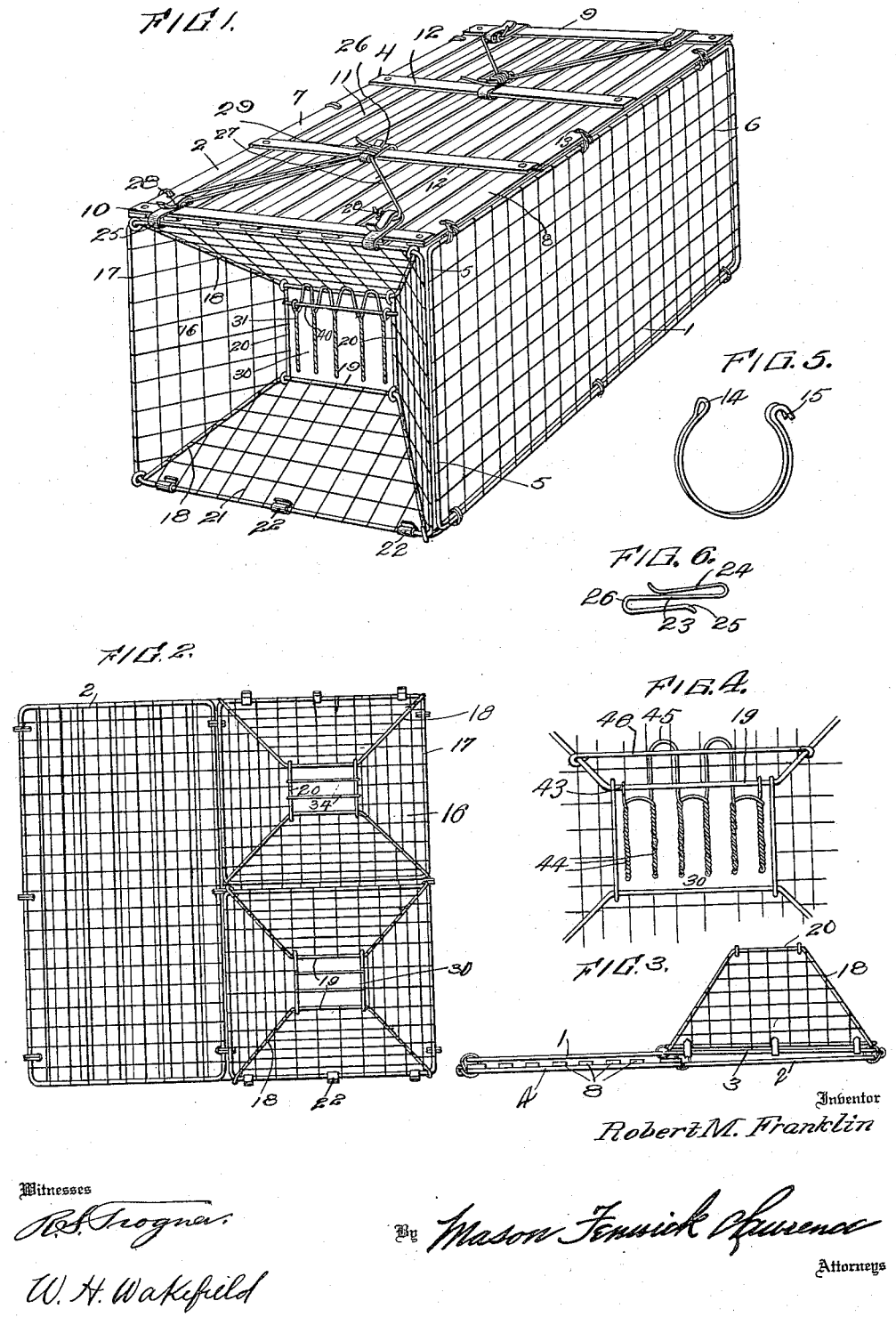

ROBERT M. FRANKLIN, OF GALVESTON, TEXAS.

CRUSTACEAN-TRAP.

1,146,698.

Specification of Letters Patent.

Patented July 13, 1915.

Application filed April 25, 1914. Serial No. 834,449.

*To all whom it may concern:*

Be it known that I, ROBERT M. FRANKLIN, a citizen of the United States, residing at Galveston, in the county of Galveston and State of Texas, have invented certain new and useful Improvements in Crustacean-Traps; and I do hereby declare the following to be a full, clear, and exact description of the invention, such as will enable others skilled in the art to which it appertains to make and use the same.

This invention relates to improvements in crustacean traps and an object of the invention is to provide a self-righting trap which may be secured to and operated either by a line having a number of other traps attached thereto, or singly on one hoisting line.

A further object of the invention is to provide a trap of this character which can be folded into a very compact space so as to take up as little room as possible when the trapping season is over, the folded trap nets being readily stacked.

A still further object of the invention is to provide a trap of this character having loosely hinged body panels held in shape by the particular form of ends employed.

A still further object of the invention is to provide improved means for readily detaching the ends from the body of the trap.

With these and other objects in view, my invention consists of the arrangement and combination of parts as will be more fully pointed out in the specification and claims.
In the drawings wherein similar reference characters designate corresponding parts: Figure 1 is a perspective view of the trap; Fig. 2 is a top plan view of the trap folded having the ends secured thereto before removal of the same; Fig. 3 is an end view of the trap as seen in Fig. 2; Fig. 4 is a fragmentary end view showing a modified form of door for the pyramidal inlet; Fig. 5 is a view showing the form of pliable metal hook used for connecting the sides, top and bottom of the trap; Fig. 6 is a detail view showing one of the double U-shaped hooks used in association with the cords for holding the pyramidal inlets to the top of the trap.

The general aim of the present invention is to provide a trap having a body made up of panels loosely hinged together by means of ring hooks so that the trap may be knocked down and folded into a very small space. The ends of the trap are formed preferably of truncated pyramids so that when the ends are drawn into the body by means of suitable cords and hooks, said truncated pyramidal ends will bind within the loosely hinged panels to hold the same tightly.

Referring particularly to the drawings, it will be seen that the trap body is made up of side panels 1 and 2, a bottom 3 and a top 4. As shown in the drawing, the sides and bottom are formed of a wire frame 5 and a filling of netting 6 of wire or some other suitable material which will retain its shape.
The top 4 as shown in the drawings comprises side bars 7 and 8 connected at the ends by end bars 9 and 10, there being provided slats or panel boards 11 and auxiliary stays or braces 12.
At suitable points along the side bars are openings 13 which receive the peculiar form of pliable ring hook seen in Fig. 5. This hook may be made of a piece of pliable wire of suitable length, doubled over in the middle to form the eye 14, and its arms pressed together and bent to form a ring while the ends of the wire are bent back upon themselves to form hooks 15. These hooks 15 are passed through the openings 13 and extend around the adjacent portion of the rectangular frame 5 after which they are slipped through the eye 14 and gripped in place by any suitable means so as to prevent accidental removal of the ring hook. The adjacent long sides of the three frames 5 are also loosely connected by means of the ring hooks seen in Fig. 5. By means of this construction, it will be seen that the sides, top and bottom of the trap are loosely hinged together so that the same may be folded to the comparatively flat position shown in Figs. 2 and 3.

The ends of the trap are closed by means of the truncated pyramidal inlets 16 each formed of a large frame 17 from which extends a pair of U-shaped elements or bails 18 whose arms are connected to the frame 17, and whose centers are straight bars 19 parallel with the bars of the frame 17. Said bars 19 are connected by a pair of braces or stays 20 which serve to form with the auxiliary frames 18 a rigid structure. This structure is seen in end elevation in Fig. 3 and in top elevation in Fig. 2. But in the construction of the rectangular sections and the inlets, I do not wish to be limited to the forms shown, and I reserve the right to change the method of construction and the materials used therein, provided, of course, such changes conform to the spirit and purposes of the invention. The four inclined sides of the inlet are provided with wire netting 21 similar to the netting employed for forming the sides and bottom of the trap.

One edge of the pyramidal inlets 16 is loosely hinged to the adjacent end of the bottom by means of metal clips 22, embracing contiguous bars of the frames 5 and 17, the inclined portions of the inlet being within the body. In order to secure the opposite side of the inlets to the top of the trap I preferably employ double U-shaped hooks as seen in Fig. 6. These hooks 26 have a common shank 23 from which bills 24 and 25 extend in opposite directions, the bill 24 being closed into contact with the shank 23 while the bill 25 is spaced from the shank 23 so that its throat is slightly open. One of these hooks has its bill 25 passing under the stay 12, while others have their bills 25 engaged over the end bars 9 and 10 and also beneath the upper side bar of the frame 17.

In order that an effective means may be provided for securing the inlet to the frame I provide a cord 27 the ends of which are knotted as at 28 for the purpose of preventing escapement of the ends of the cord from the hooks. This cord is led from the small end 24 of one of the hooks 26 carried by bar 10 through the corresponding small end of another of the hooks 26 carried by an auxiliary bar 12 and through the similar small end of another hook 26 carried by said bar 10 back under the small end 24 of the hook 26 carried by said auxiliary bar 10 and wrapped therearound several times as indicated at 29 for the purpose of securing the cord against dislodgment. In this way, it will be seen that the ends of the trap are held to its body, and all parts will be bound together tightly taking up all the play afforded by the ring hooks illustrated in Fig. 5. Of course, the inlets at each end of the trap are identical and a description of one will suffice for the other.

As shown in Fig. 1, I have provided a gate for the entrance to the trap for the purpose of preventing exit from the trap, but readily giving entrance thereto. The space defined between the wire sections 19 and the stays 20 forms the passage-way 30 through which the *Crustacea* pass. The gate 31 which I employ for closing the opening 30 is formed of a single wire, repeatedly doubled over on itself as follows: first, to form a loop 43 for hinging the gate on a wire, 40 secured across the inlet opening about one inch from its upper edge; next carried downward within say one to three inches of the lower edge of the inlet opening, whence the wire is carried again upward and twisted on itself to form the first pendant finger 44 of the gate; from this point the wire is bent over and carried again downward and then upward to form the second finger, say half inch from the first finger; then the wire is carried above the cross wire 40 to form a stop 45 resting against the bar 19; and this is repeated to form each finger and intervening space until a sufficient number of fingers are provided to guard the entire inlet opening, when the wire is finally bent to form the second hinge loop opposite and in line with the first hinge loop. This gate when thus formed, or in any manner which will secure a substantially similar structure, has stops above its hinge loops bent about 25 degrees, so that the fingers may hang vertically while the upper part of the gate rests against the outer face of the inlet. The gate thus formed is hung on the wire 40. It will be noted that this gate thus constructed and hung will readily open inward, and the open space between and below the ends of the fingers will tempt both fish and *Crustacea* to push under the yielding gate and enter, while the upper edge of the gate will impinge against the face of the inlet and prevent the gate from opening outward for their escape. For crabs or average size lobsters I use a modified form of this inlet opening, by leaving the gate off and securing across the face of the inlet one or more wires 34 with just enough space to permit the crabs or lobsters to squeeze through, as shown in Fig. 2. These wires serve to entangle the claws and spines of the *Crustacea* and thus prevent their exit.

It will be understood that when the trap is to be used the same can be lowered by means of a single line and inasmuch as the top of the trap is formed of material which is lighter than the sides and bottom the trap will strike bottom right side up. While wood can be used for making the top, yet any other material which is lighter than the material forming the sides, bottom and ends of the trap may be used, but it is preferable that the material be lighter than water. When the trap has assumed the position shown in Fig. 1, the *Crustacea* approach the pyramidal inlets forming the ends of the trap and finding the gate movable, thrust their way inside to devour the bait contained in the trap. It should be noted here that as wood is used for the top of the trap, it is necessarily more bulky and the wide slats or panels 11 will serve to shut out light from the top of the trap and thereby give a cavernous appearance to the trap which will of course invite the victims. When it is desired to disassemble the trap, the cord 27 may have the end thereof untied from the